April 3, 1956 — A. WEHNER — 2,740,525
SCREEN BOTTOMS
Filed May 18, 1954 — 2 Sheets-Sheet 1

*INVENTOR:*
ALBERT WEHNER,

April 3, 1956 A. WEHNER 2,740,525
SCREEN BOTTOMS
Filed May 18, 1954 2 Sheets-Sheet 2
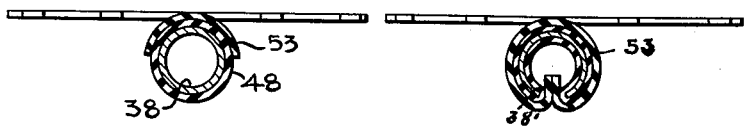
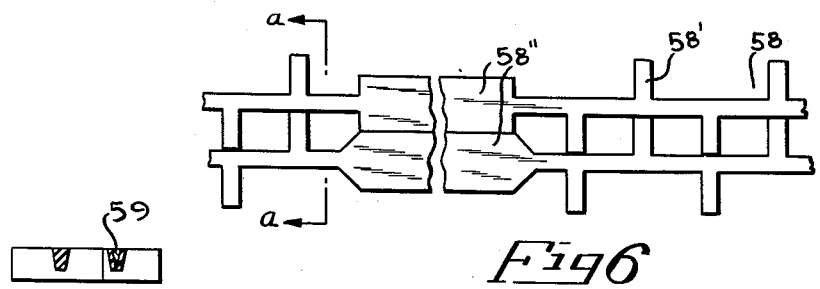
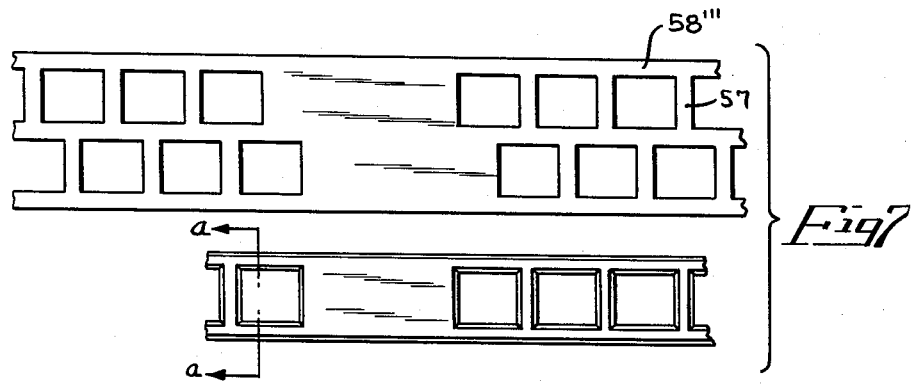
*INVENTOR:*
ALBERT WEHNER,

United States Patent Office 2,740,525
Patented Apr. 3, 1956

2,740,525
SCREEN BOTTOMS

Albert Wehner, Dusseldorf, Germany, assignor to Brueckenbau Flender G. m. b. H., Dusseldorf, Germany, a limited liability company Application May 18, 1954, Serial No. 430,558

Claims priority, application Germany May 20, 1953

5 Claims. (Cl. 209—399)

The invention relates to screen bottoms.

It is known to apply to screen bottoms consisting of several successive or adjacent parts or members crosswise extending supports the latter being adjustably connected with the screen frames. These screen bottom members consist of rod-shaped profiled wires which enclose therebetween slot-shaped separator openings. Screen bottoms of this type have the great advantage of practically eliminating their clogging; moreover they have an excellent durability. However, their application to the separation of materials containing columnar and stalk-shaped components involves disadvantages insofar as a considerable portion of the granular components flows through the screens.

It is the main object of the invention to eliminate this disadvantage and to improve the screening capacity as well as the duration of the screen bottoms.

With this object in view the rod-shaped profiled wires usually forming the screen bottoms are replaced by broad flat material strips made of a flexible elastic material and, particularly, perforated bands of rubber or elastic artificial materials such as perlon; the bands are tensioned to form operative screen openings; in replacement of the perforated rubber bands strips of an elastic material may be used which are provided with recesses and thereby form operative openings upon being mounted. The holes or recesses of the non-tensioned members of the screen bottom are so controlled that the correct size of the openings is only reached in the stretched or extended state of the screens.

In conformity with the invention cross supports are provided which carry the elastic strip-shaped screen members these supports being provided with an elastic lining; moreover, the screen strips are connected with their supports and their linings by means of downwardly extending projections. In this manner not only a reliable and abrasion resistant connection is obtained but at the same time a smooth screen surface is created.

The elastic screen bottom forming strips are provided with steel inserts which serve to greatly reinforce the strips in a direction transversely extending to the tensioning direction, which is of particular advantage when using elastic screen bottoms having large openings.

By the installation of individual tension zones between one and the adjacent tensioning ledge not only the bearing capacity of the screen bottoms consisting of broad elastic strips is increased but also the durability is greatly extended, since the specific material stresses at an equal total load applied to the bottom are greatly reduced by the multiple surface-enlarged tensioning of the screen bottom. From the operative point of view it is also important that the proper tensioning of the screen bottom does not require specific attention.

The elastic materials used for the production of the elastic screen bottom forming strips may be rubber or artificial elastic materials which require a specific tensioning to obtain a maximum effect.

Upon tensioning the screen bottom the individual supporting members are connected with the same by means of screen and the like and in this manner fixed in their mutual position. The tensioning of the individual bottom zones may be effected by the use of toggle joints, swivels and the like which after the mounting of the screen bottom are removed. This mode of fastening and tensioning of the bottom leads to a reliable tension-solidity and a smooth screen bottom surface. The elastic lining of the carrying profiles takes part in the tensioning of the screen bottom zones and helps to preserve the screen bottom, since the stresses applied to the same are elastically taken up.

The here proposed zonal fastening and tensioning is highly recommendable for all types of broad screen bands and strips made of the above stated elastic materials.

The difficulties arising with the hitherto customary application of fine webs, filtering cloth and finely perforated plates to a screen frame are well known. Heavy steel frames made of flat or angular iron to which the above named screen plates are fastened are used for this purpose, the frames being connected with the screen frames by iron sheets which act as a running board. In many cases additional supporting webs must be provided to support the screen webs or strips proper, the latter requiring a particular difficult fastening method. Nevertheless, and as proven by practical experience, flutter breaks and other disadvantages could not be eliminated.

If, however, the screen plates are zonally fastened these difficulties are eliminated and smooth screen bottoms result of a surprising bearing capacity which may be easily arranged in the shape of cascades.

Moreover, the screen bottom strips tensioned in their consecutive zones represent swinging membranes of a self-cleaning property whereby clogging of the screens is prevented.

In the same manner as described above the so-called "dead-floors" of screening machines may be used serving as an exclusive means for the material transport. These dead-floors consist of plates which are exposed to quick abrasion and corrosion; moreover, and particularly with materials which cause screening difficulties the transport must be often interrupted, since the materials adhere to the dead floors. If, however, these dead floors are made of an elastic material in conformity with the invention the individual zones represent swingable members, which facilitate the transport of the goods and greatly reduce abrasion.

The invention will now be described more in detail and with reference to the accompanying drawings.

In the drawings:

Figs. 4–7 illustrate modifications of the device shown in Fig. 2 of which

Figs. 4 and 5 are vertical sectional views of the screen bottom supporting means;

Figs. 6 and 7 are enlarged top views of a portion of the screen bottom illustrating the screen openings; and Figs. 6a and 7a are vertical sectional views of lines a—a of Figs. 6 and 7.

Figure 1:
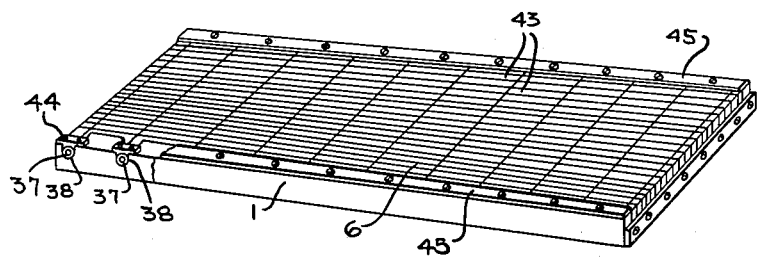
Fig. 1 shows a perspective view of the screen bottom.

As apparent from Fig. 1 the screen bottom 6 is encased by an outer frame 1; the screen bottom consists of a plurality of successive zones 43 extending in the longitudinal direction of the screen bottom said zones being composed of perforated flat strip-shaped members 47 of an elastic material, the strips being secured in their position by wires located in the carriers 38. These supports 38 are provided with fastening latches 44 which are welded to the end of the supports 38 and upon tensioning of the bottom zones are secured by screws to the frame 1. The tensioning of the screen bottom may be effected by winches, toggle joints, swivels and the like which are removed after the screen zones have been tensioned. The mounting places are covered by longitudinal ledges 45. The individual screen zones or portions 43 represent independently swingable membranes.

Figure 2:
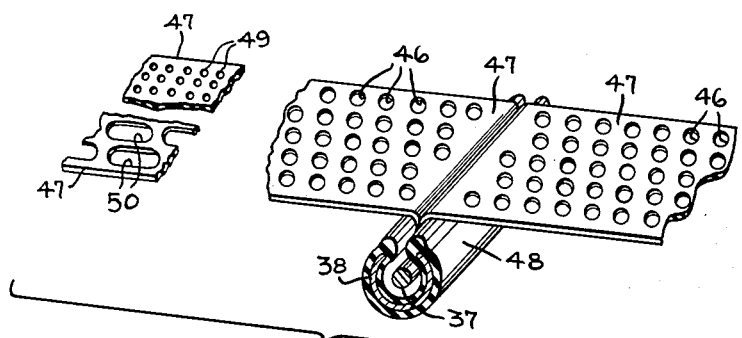
Figs. 2 and 3 are perspective views of the screen bottom members.

In conformity with Fig. 2 the screen bottom which is provided with the perforations 46 consists of successive elastic strips 47. The carrier 38 has a rubber cover 48.

As apparent from the left part of Fig. 2 the strips 47 may be also provided with size-reduced holes 49 or slot-shaped recesses 50.

Figure 3:
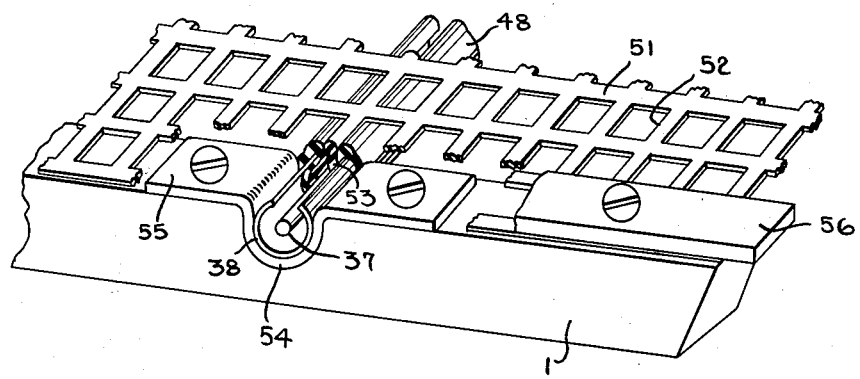

In conformity with Fig. 3 a lattice shaped screen bottom 51 made of rubber or artificial elastic materials is provided; this screen bottom 51 has downwardly extending flaps 53 caused by the application of holes 52 to said bottom; this bottom is with its downwardly pulled flaps 53 fastened to the supports or carriers 38 which are provided with rubber castings 48. The carrier 38 is located in a band 54 of the lash 55. The lashes 55 are secured upon frame 1 and covered by a ledge 56.

In conformity with the modification of the invention shown in Fig. 4 the downwardly extending elastic flaps 53 are glued to the carrier 38 or vulcanized onto the same.

According to the embodiment of the invention shown in Fig. 5 the ends of the elastic flaps 53 are pressed into a slot 38' of the carrier 53.

Figs. 6 and 6ª illustrate a manner of forming separator openings from the elastic strips 58' the latter being provided with lateral recesses 58. It is advisable that the remaining extensions downwardly project beyond the height of the profiles in order to secure the desired size of the bottom holes and meshes in spite of excessive movements of the elastic screen bottom members.

It is with regard to the installation of the screen bottoms advisable to omit the lateral recesses 58 at the mounting place 58" consisting of these portions of the screen bottom located above the cross-supports 38 since in this manner closed cross strips are formed which cover the transverse supports located beneath said cross strips and prevent abrasion of the materials to be screened.

In order to promote a uniform loosening of the goods upon the screen consisting of perforated rubber sheets additional slots may be provided along some or all rows of the perforations.

Numeral 59 denotes a cast steel insert serving to reinforce the screen bottom in the direction of the passage of the materials to be screened; this insert may be made of single members to prevent excessive reduction of the elecricity of the screen members.

In Fig. 7 screen bottom members 58''' are shown which are provided with square holes; these bottom members are adjacently mounted and preferably consist of an elastic material. The cross strips 57 are preferably conically shaped in the direction of passage of the materials to be screened. During the mounting of these strips in the longitudinal direction of the bottom it is advisable to apply the same in a stretch-released state, whereby distortion of the separator openings is eliminated.

Since certain changes in carrying out the above invention could be made without departing from the scope thereof, it is intended that all matter contained in the above description or shown in the accompanying drawing shall be interpreted as illustrative and not in a limiting sense.

I claim:

1. In a perforated screen bottom, an outer frame, a plurality of screen bottom members forming a plurality of successive screening zones supported by said frame, pretensioned carriers applied to said screen bottom members, said carriers extending in the cross direction of said screen bottom being located at the ends of each zone and being fastened to said frame, said screen bottom members consisting of flat broad strips of an elastic material and being provided with downwardly extending elastic flaps, the latter being fastened to said carriers.

2. In a perforated screen bottom, an outer frame, a plurality of screen bottom members forming a plurality of successive screening zones supported by said frame, pretensioned carriers applied to said screen bottom members, said carriers extending in the cross direction of said screen bottom being located at the ends of each zone and being fastened to said frame, said screen bottom members consisting of flat broad strips of an elastic material and said carriers being provided with an elastic cover substantially extending over their entire length.

3. In a perforated screen bottom, an outer frame, a plurality of screen bottom members forming a plurality of successive screening zones supported by said frame, pretensioned carriers applied to said screen bottom members, said carriers extending in the cross direction of said screen bottom being located at the ends of each zone and being fastened to said frame, said screen bottom members consisting of flat broad strips of an elastic material and being provided with cross strips which cover the carriers.

4. In a perforated screen bottom according to claim 1, said screen bottom members consisting of perforated rubber plates.

5. In a perforated screen bottom according to claim 1, said elastic screen bottom members being provided with steel inserts.

References Cited in the file of this patent

UNITED STATES PATENTS

| 1,164,723 | Kerrigan | Dec. 21, 1915 |
| 1,663,298 | Geer | Mar. 20, 1928 |
| 1,718,385 | Sherwood | June 25, 1929 |
| 2,114,329 | Blackburn | Apr. 19, 1938 |
| 2,220,985 | Wilson | Nov. 12, 1940 |
| 2,271,900 | Mowbray | Feb. 3, 1942 |

FOREIGN PATENTS

| 609,960 | Germany | Feb. 28, 1935 |
| 696,795 | Germany | Sept. 30, 1940 |